United States Patent [19]

Tiefenthaler

[11] Patent Number: 4,986,512
[45] Date of Patent: Jan. 22, 1991

[54] SERVO PISTON VALVE

[75] Inventor: Edelbert Tiefenthaler, Elgg, Switzerland

[73] Assignee: Sulzer Brothers Limited, Winterthur, Switzerland

[21] Appl. No.: 510,959

[22] Filed: Apr. 19, 1990

[30] Foreign Application Priority Data

Apr. 27, 1989 [CH] Switzerland ............. 01609/89

[51] Int. Cl.$^5$ .................... F16K 1/12; F16K 31/124
[52] U.S. Cl. ..................................... 251/33; 137/509; 251/118; 251/282
[58] Field of Search .............. 137/509; 251/118, 43, 251/39, 33, 282

[56] References Cited

U.S. PATENT DOCUMENTS

| 2,865,595 | 12/1958 | Barlow | 251/118 |
| 3,729,167 | 4/1973 | Gulich | 251/39 |
| 4,088,297 | 5/1978 | Doyle et al. | 251/33 X |
| 4,901,978 | 2/1990 | Feild | 137/509 X |

FOREIGN PATENT DOCUMENTS 505972 12/1954 Italy .......................... 251/33

Primary Examiner—Stephen M. Hepperle
Attorney, Agent, or Firm—Kenyon & Kenyon

[57] ABSTRACT

A moving valve lid cooperating with a valve seat is provided in a valve body. The lid is connected by way of a spindle to a servopiston moving in a cylinder. The valve seat merges, on the side remote from the side, into a compensating cylinder in which a compensating piston connected coaxially to the lid is guided. Those end faces of the lid and compensating piston which are near one another are of substantially the same size as one another. A hollow flow deflector is disposed in the valve body upstream of the valve seat and the lid has an extension medium inflow side which is of substantially the same diameter as the lid which extends into the flow deflector.

16 Claims, 1 Drawing Sheet

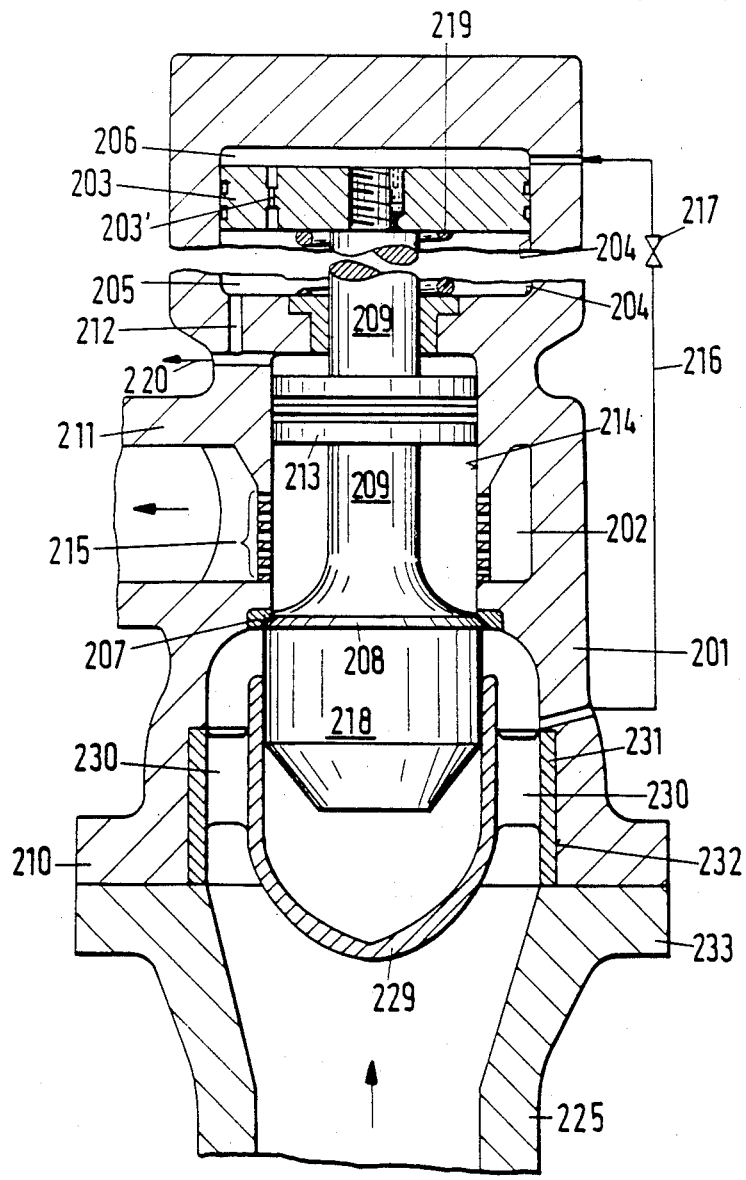

SERVO PISTON VALVE

This invention relates to a valve. More specifically, this invention relates to a pressure-medium-operated valve.

As is known, various types of valves have been known which can be operated by the pressure medium which is to be controlled by the valve. For example, Swiss Patent No. 589,815 describes a pressure-medium-operated valve having a casing which encloses a valve chamber and in which a moving valve lid cooperates with a valve seat in the casing. In addition, a cylinder is provided in the housing which is screened from the valve chamber and which is subdivided by a servopiston into two subchambers. A spindle is also provided to connect the lid to the servopiston. The housing also communicates on that side of the valve seat near the lid by way of an inlet port with a pressure medium supply and, on that side of the valve seat remote from the lid, by way of an outlet port with a pressure medium sink. A pressure-controlling means is also provided for selectively energizing at least one of the two subchambers at various pressures being provided in order to move the lid towards or away from the seat.

A valve of this kind is usually designed in accordance with static force—i.e. the forces acting on the moving system—i.e., the system comprising the valve lid, servo piston and spindle when such a system is in a normal state. However, when the valve opens, various dynamic forces act on the moving system. For example, pressure surges may arise because the pressure of the medium, which is propagated from the inlet port towards the outlet port, acts on the back of the lid as well as on the lid front and thus accelerates the opening movement. This can lead to undesirable vibration of the lid. When the pressure differences are very considerable, the pressure surges also cause mechanical stress throughout the pressurized system. Also, other dynamic forces may be effective with the valve open, such as pulsating forces caused by deflection of the flow of the medium at the lid. Finally, the moving system may experience dynamic forces caused by a change in the state of the medium flowing through the valve if the medium is, for example, steam which because of a pressure change suddenly carries water along with the steam, the water striking the lid abruptly.

Accordingly, it is an object of the invention to reduce the effect of dynamic forces which arise in a pressure-medium-operated valve during opening and closing.

It is another object of the invention to provide a simple and economic valve construction for a pressure-medium-operated valve to reduce the effects of dynamic forces during opening and closing of the valve.

Briefly, the invention is directed to a valve having a valve housing with an inlet port for connection to a pressure medium supply, an outlet port for connection to a pressure medium sink, a cylindrical chamber between and in communication with the ports, a valve seat between the inlet port and the chamber and a second cylindrical chamber spaced from the first cylindrical chamber. In addition, the valve has a valve lid disposed in the housing in seated relation with the valve seat in order to block a flow of pressure medium from the inlet port into the first chamber. Also, a servopiston is slidably mounted in the second cylindrical chamber in order to subdivide this chamber into a pair of subchambers. Still further, a spindle connects the valve lid with the servopiston and extends through the two cylindrical chambers.

In accordance with the invention, a compensation piston is disposed on the spindle and is slidably mounted in the first chamber in order to sub-divide this chamber into two subchambers with the subchamber between the compensation piston and the valve seat being in communication with the outlet port. This chamber thus functions as a compensation chamber for the flow of pressure medium when the valve is opened.

Still further, an extension is provided on the valve lid which extends upstream of the valve seat while a hollow flow deflector is disposed in the housing to receive the extension therein and to deflect a flow of pressure medium from the inlet port about the extension.

The valve is also provided with a means for selectively pressurizing at least one of the subchambers of the second chamber in order to move the valve lid relative to the valve seat.

When in use, for example, during opening of the valve, pressure surges are mostly absorbed in the compensating cylinder between the lid and the compensating piston. Thus, there is less tendency to vibrate and the opening and closing movements proceed smoothly. Mechanical stressing of the valve is also reduced.

Because of the flow deflector in association with the lid extension which extends into the deflector, no flow deflections are produced on the inflow side of the valve lid. Thus, the resulting pulsating forces are also obviated. Also, abrupt changes in the state of the medium, for example, water hammer, do not affect the lid since they are intercepted by the flow deflector which is rigidly disposed in the valve body.

These and other objects and advantages of the invention will become more apparent from the following detailed description taken in conjunction with accompanying drawing wherein:

The drawing illustrates a part cross-sectional view of a valve constructed in accordance with the invention.

Referring to the drawing, the valve includes a valve housing 201 having an inlet port 210 for connection to a pressure medium supply and an outlet port 211 for connection to a pressure medium sink. In addition, the housing 201 contains a cylindrical chamber 214 and an annular concentric chamber 202 about the cylindrical chamber 214. As indicated, a perforated wall surrounds the cylindrical chamber 214 so as to communicate the chambers 214, 202 with each other. In addition, the annular chamber 202 communicates with the outlet port 211.

In addition, the housing has a valve seat 207 between the inlet port 210 and the cylindrical chamber 214 as well as a second cylindrical chamber 204 spaced from and screened from the cylindrical chamber 214. As indicated, a servopiston 203 subdivides the second chamber 204 into a bottom subchamber 205 and an upper sub-chamber 206.

The valve also has a valve lid 208 which is disposed in the housing 201 to cooperate with the valve seat 207 to block a flow of pressure medium from the inlet port 210 into the cylindrical chamber 214 when seated on the valve seat 207. The valve lid 208 is also connected by a spindle 209 to the servopiston 203. As indicated, this spindle 209 passes through the respective chambers 214, 204.

A compensation piston 213 is also disposed on the spindle 209 and is slidably mounted in the cylinder chamber 214 which functions as a compensation chamber as explained below. As indicated, the compensation piston 213 subdivides the chamber 214 into two subchambers. The lower subchamber, that is, the subchamber between the compensation piston 213 and the valve seat 207 is in communication with the outlet port 211 while the upper subchamber which is remote from the valve lid 208 communicates via a relief line 220 in the housing 201 with a pressure medium sink which is preferably the same sink as the one to which the outlet port 211 is connected.

As illustrated, the valve lid 208 and the compensating piston 213 have mutually facing end surfaces of substantially the same diameter. In addition, the piston 213 is coaxial with the spindle 209 and the valve lid 208.

A duct 212 is provided within the housing 201 in order to communicate the bottom subchamber 205 of the servopiston chamber 204 with the relief line 220 and, therefore, with the pressure medium sink (not shown). In is addition, a compression spring 219 is disposed in the bottom subchamber 205 to boost the closing movement of the valve lid 208 so that the valve stays closed in the absence of pressure.

A restrictor bore 203' in the servopiston 203 interconnects the two subchambers 205, 206.

A means is also provided for selectively pressurizing at least one of the subchambers of the servopiston chamber 204 in order to move the valve lid 208 relative to the valve seat 207. As illustrated, this means includes a line 216 which communicates the inlet port 210 with the top subchamber 206 as well as a control valve 217 in the line 216.

The lid 208 is provided on the inflow side with a cylindrical extension 218 which is of substantially the same diameter as the greatest diameter of the lid 208 and which merges at a bottom end as shown in the drawing into a frustum. The extension 218 extends into a hollow flow deflector 229 whose top part is in the form of a cylindrical guide for the extension 218 and whose bottom part is streamlined. The deflector 229 is connected by way of a number of radial ribs 230 to a ring 231. The inside diameter of the ring 231 is substantially equal to the diameter of the valve housing 201 in the medium entry zone. To receive the ring 231, the inlet port 210 is formed with an annular groove adapted to the outside diameter of the ring 231, the grove 232 terminating at the top end in a shoulder in which the top end face of the ring 231 engages. The bottom end face of the ring 231 bears on a flange 233 of a line 225 connected to the inlet port 210.

Consequently, the deflector 229 defleCts the medium inflowing through the line 225 into the annular chamber between the deflector 229 and the valve body 201, so that pulsating forces produced by the deflection are taken up by the stationary deflector 229. Consequently, the lid 208 when open experiences no appreciable deflections and, therefore, pulsating forces. The streamlined surface of the deflector 229 experiencing the inflowing medium is substantially free from orifices or perforations; however, the deflector 229 can be formed with a small bore just for expelling medium from the cavity when the lid 208 opens and for intaking medium when the lid 208 makes a closing movement.

The drawing shows the safety valve in a normal position i.e., in the closed state. In this state, the valve 217 is also in the closed state. Consequently, the same low pressure as exists in the relief line 220 exists in the bottom subchamber 205 and, because of the restrictor bore 203, in the top subchamber 206 as well as in the compensating cylinder end which is remote from the lid 208 and which communicates with the bottom subchamber 205 by way of the duct 212. The same low pressure as exists in the outlet port 211 also exists in the compensating cylinder 214 between the lid 208 and the compensating piston 213. However, the high pressure of the medium acts on the lid end face near the inlet port 210 and presses the lid 208 sealingly on to the valve seat 207. Condensate evolved in the cylinder 204 can be removed by way of the restrictor bore 203' and the duct 212.

When the control valve 217 opens, the high pressure in the inlet port 210 acts by way of the line 216 in the top subchamber 206. Since the quantity of pressure medium escaping through the restrictor bore 203' is very small, the lower pressure in the bottom subchamber 205 continues initially to exist, the pressure relationships in the rest of the valve remaining unchanged. Since the servopiston end face which bounds the top subchamber 206 is larger than the lid end face experiencing the high pressure in the inlet port 210, the spindle 209 and all the parts connected thereto descend, the valve opening. The pressure acting on the back of the lid 208 also acts on the compensating piston end face near the lid. Since these two end faces are of substantially the same size, the resulting forces cancel one another out and the position of the lid 208 is not appreciably affected by pressure surges.

When the control valve 217 closes, the pressure in the top subchamber 206 decreases and the difference between, on the one hand, the pressure in the inlet port 210 times the cross-sectional area of the lid end face near the latter port and, on the other hand, the pressure in the top subchamber 206 times the cross-sectional area of the servopiston end face facing the subchamber 206 so acts that the valve recloses and the lid 208 is pressed firmly on to the seat 207. This movement is further enhanced by the compression spring 219 the pressure difference between the two end faces of the compensating piston 213 and the medium flow. After closure of the valve, the pressure in the compensating chamber 214 and valve chamber 202 drops and the pressure conditions operative prior to the opening of the control valve 217 are restored.

As a variant of the embodiment describes, the valve is also of use in pressure-medium-operated flow-controlling valves.

The invention thus provides a relatively simple pressure-medium-operated valve in which the effect of dynamic forces which arise when the valves opens and closes is reduced in a simple and economic manner.

What is claimed is:

1. A valve comprising
    a valve housing having an inlet port for connection to a pressure medium supply, an outlet port for connection to a pressure medium sink, a first cylindrical chamber between and in communication with said ports, a valve seat between said inlet port and said chamber, and a second cylindrical chamber spaced from said first cylindrical chamber;
    a valve lid disposed in said housing in seated relation with said valve seat to block a flow of pressure medium from said inlet port into said first chamber;
    a servopiston slidably mounted in said second cylindrical chamber to sub-divide said second chamber into a pair of sub-chambers;
    a spindle connecting said valve lid and said servopiston and extending through said cylindrical chambers;

a compensation piston on said spindle and slidably mounted in said first chamber to sub-divide said first chamber into two sub-chambers, said sub-chamber between said compensation piston and said valve seat being in communication with said outlet port;

means for selectively pressurizing at least one of said sub-chambers of said second chamber to move said lid relative to said valve seat;

an extension on said valve lid extending upstream of said valve seat;

a hollow flow deflector disposed in said housing and receiving said extension therein for deflecting a flow of pressure medium from said inlet port about said extension; and said lid and said compensating piston have mutually facing end surfaces of substantially the same diameter.

2. A valve as set forth in claim 1 wherein said sub-chamber of said first cylinder remote from said valve lid is in communication with a pressure medium sink.

3. A valve as set forth in claim 1 wherein said hollow deflector includes a plurality of radially disposed ribs for connecting said deflector to said housing.

4. A valve as set forth in claim 3 which further comprises a closed ring seated in said housing and connected to said ribs coaxially of said deflector.

5. A valve as set forth in claim 1 wherein said means includes a line communicating said inlet port with one of said sub-chambers of said second cylinder to deliver pressure medium from said inlet port to said one sub-chamber.

6. A valve as set forth in claim 1 wherein said housing has a perforated wall surrounding said sub-chamber of said first chamber between said compensating piston and said valve seat and a third chamber about said wall in communication with said outlet port.

7. A valve as set forth in claim 1 further comprising a spring in said second chamber biasing said servopiston in a direction to close said valve lid on said valve seat.

8. In a valve, the combination comprising a valve housing having an inlet port for connection to a pressure medium supply, an outlet port for connection to a pressure medium sink, a first cylindrical chamber between and in communication with said ports, a valve seat between said inlet port and said chamber, and a second cylindrical chamber spaced from said first cylindrical chamber;

a valve lid disposed in said housing in seated relation with said valve seat to block a flow of pressure medium from said inlet port into said first chamber;

a servopiston slidably mounted in said second cylindrical chamber to sub-divide said second chamber into a pair of sub-chambers;

a spindle connecting said valve lid and said servopiston and extending through said cylindrical chambers;

a compensation piston on said spindle and slidably mounted in said first chamber to sub-divide said first chamber into two sub-chambers, said sub-chamber between said compensation piston and said valve seat being in communication with said outlet port;

an extension on said valve lid extending upstream of said valve seat; and a hollow flow deflector disposed in said housing and receiving said extension therein for deflecting a flow of pressure medium from said inlet port about said extension.

9. The combination as set forth in claim 8 further comprising a spring in said second chamber biasing said servopiston in a direction to close said valve lid on said valve seat.

10. The combination as set forth in claim 9 means for selectively pressurizing at least one of said sub-chambers of said second chamber to move said lid relative to said valve seat.

11. The combination as set forth in claim 10 wherein said means includes a line communicating said inlet port with one of said sub-chambers of said second cylinder to deliver pressure medium from said inlet port to said one sub-chamber.

12. The combination as set forth in claim 8 wherein said lid and said compensating piston have mutually facing end surfaces of substantially the same diameter.

13. The combination as set forth in claim 8 wherein said casing includes a relief line for connecting said sub-chamber of said first cylinder remote from said valve lid to a pressure medium sink.

14. The combination as set forth in claim 8 wherein said housing has a perforated wall surrounding said sub-chamber of said first chamber between said compensating piston and said valve seat and a third chamber about said wall in communication with said outlet port.

15. A valve as set forth in claim 1 wherein said extension is of substantially the same diameter as said valve lid.

16. A valve as set forth in claim 8 wherein said extension is of substantially the same diameter as said valve lid.

* * * * *

UNITED STATES PATENT AND TRADEMARK OFFICE
CERTIFICATE OF CORRECTION

PATENT NO. : 4,986,512
DATED : January 22, 1991
INVENTOR(S) : EDELBERT TIEFENTHALER It is certified that error appears in the above-identified patent and that said Letters Patent is hereby corrected as shown below:

```
Column 3, line 45 change "grove" to -groove-
Column 3, line 50 change "defleCts" to -deflects-
Column 6, line 26 after "claim 9" insert
         -further comprising a-
```

Signed and Sealed this

Twenty-eighth Day of July, 1992

*Attest:*

DOUGLAS B. COMER

*Attesting Officer*   Acting Commissioner of Patents and Trademarks